United States Patent [19]

Sousa

[11] 4,281,356
[45] Jul. 28, 1981

[54] MAGNETIC DISK MEMORY
[75] Inventor: Frank E. Sousa, Pelham, N.H.
[73] Assignee: R. C. Sanders Technology Systems, Inc., Amherst, N.H.
[21] Appl. No.: 98,347
[22] Filed: Nov. 28, 1979
[51] Int. Cl.³ .............................................. G11B 5/09
[52] U.S. Cl. ........................................ 360/45; 360/51
[58] Field of Search ...................... 360/39, 45, 51, 43
[56] References Cited
U.S. PATENT DOCUMENTS

| 3,930,265 | 12/1975 | Kimura | 360/45 |
|---|---|---|---|
| 4,173,027 | 10/1979 | Rathbun | 360/45 |
| 4,205,352 | 5/1980 | Tomada | 360/45 |

OTHER PUBLICATIONS

"Double Density Design Guide"-Shugart Associates, Application Bulletin.

NEC Microcomputers, Inc., Specification Sheet 4, MPD765, "Floppy Disc Controller".
NEC Microcomputers, Inc., Applications Note #8 for MPD765.

Primary Examiner—Vincent P. Canney
Attorney, Agent, or Firm—Kenway & Jenney

[57] ABSTRACT

In the apparatus disclosed herein, data recorded on a floppy disk in double density MFM mode is read back using a digital, adaptive time base system which permits accurate recovery of data despite bit shifting due to a high bit density on the magnetic recording surface. The adaptive time base provides successive data windows of non-uniform duration following detection of a data bit and, further, alters the starting reference time based upon the relation of the just received data bit to its predecessor.

12 Claims, 2 Drawing Figures

MAGNETIC DISK MEMORY

BACKGROUND OF THE INVENTION

The present invention relates to magnetic disk recording and more particularly to the recovery of data from double density floppy diskettes.

In the storage of data for computer and word processing applications, the desire to increase the amount of data which can be recorded on a given surface has led both to more sophisticated encoding techniques and to the use of high bit densities on the magnetic surfaces themselves. In storing large quantities of data on floppy diskettes, one of the increasingly popular methods is to utilize so-called double density recording, with encoding being done in the MFM mode. This is the recording technique utilized by International Business Machines (IBM) for its large capacity diskette systems. Since IBM is an industry leader and the original source of the floppy diskette recording technique, there exists a substantial advantage to employing this format.

In double density recording, however, the bit pattern on the inner tracks of the disk is actually so dense that magnetic interaction actually causes the bits to shift with respect to one another, i.e. as compared with the idealized time base employed during recording. As is well understood, a given nominal recording frequency will produce a higher bit density at the inner tracks, assuming a constant rate of rotation of the diskette is employed.

In order to overcome this tendency toward bit shifting, some disk drive interface manufacturers have employed a precompensation scheme which alters the timing during the recording of bit patterns, the alteration being in a manner which is intended to cancel out the effects of bit shifting. These precompensated recordings, however, do not conform to the IBM established standard.

Instead of pre-compensation, some disk drive manufacturers and interface manufacturers have chosen to provide some sort of post compensation or filtering to enable double density recorded data to be recaptured. While these latter techniques have met with some success, they have typically been limited in that they have been not allowed the use of all of the originally provided for track positions. In other words, the innermost tracks were unusable.

The most commonly utilized forms of filtering or post-compensation systems are based upon a phase locked loop and most floppy disk controllers provide for the use of such a system in regenerating data window timing. More recently, it has also been proposed to utilize a counter to generate a series of equal data windows following the receipt of a data bit from the floppy disk device. Again, these devices are limited in their ability to deal with bit shifting at the innermost tracks of a double density floppy disk recording, particularly when the recording is encoded in the MFM mode.

Among the several objects of the present invention may be noted the provision of apparatus for recovering data serially recorded on magnetic media at a high density tending to produce bit shifting; the provision of such apparatus which will read double density MFM encoded floppy diskettes; the provision of such apparatus which is highly reliable; and the provision of such apparatus which is of relatively simple and inexpensive construction. Other objects and features will be in part apparent and in part pointed out hereinafter.

SUMMARY OF THE INVENTION

In recovering data recorded at high density the present invention utilizes a digital adaptive time base system which generates successive data windows having different durations, depending on the past history of read data bits.

Briefly, the apparatus employs a presettable counter which is driven by a clock signal having a frequency which is a large multiple of the nominal data frequency. At the end of a count sequence, the counter complements the state of a data window signal. A gating means, operative in response to a received data bit, loads into the counter a value which is a function of the state of the shift register and also enters a corresponding data bit into the shift register. This gating means is also operative, at the end of each count sequence, for loading into the counter the value which is a function of data held in the shift register and for advancing the state of the shift register. The counter, by virtue of this presetting or equivalent decoding, generates successive data window intervals which are unequal in length, although each is a multiple of the relatively high clock frequency.

Following receipt of a data bit, an initial delay is preferably provided before the first data window. This initial delay is roughly equal to half the nominal data window interval. In accordance with another aspect of the invention, however, this initial delay is varied in accordance with the relationship of the then just received data bit to its predecessor.

DESCRIPTION OF THE PREFERRED EMBODIMENT

In double density MFM data recording on floppy diskettes, both data and clock pulses are recorded and the basic data/clock frequency is one megacycle. Either a data pulse or a clock pulse may be read out as a "bit". In recording the data, there are thus a succession of one-microsecond time "windows" in which a binary bit may be present or not. These time windows alternate between data pulses and clock pulses in accordance with the MFM encoding scheme. Each data cell comprises two portions, a data window and a clock window. In accordance with the MFM encoding algorithm, data bits are written as pulses starting at the center of the bit cell. Clock bits are written as pulses starting at the beginning of the bit cell and are entered if:

1. No data has been written in the previous bit cell; and
2. No data will be written in the present bit cell.

Basically, the apparatus of the present invention is not concerned with the separation of received bits into data and clock pulses. Rather, all received pulses are passed out into the controller circuitry proper. The function of the apparatus of the present invention is to regenerate a data window signal which will accurately allow the controller to determine within which window each received pulse properly falls, relative to the previous pulse. The data window signal is a binary signal which complements state at the end of each data window interval.

Figure 1:
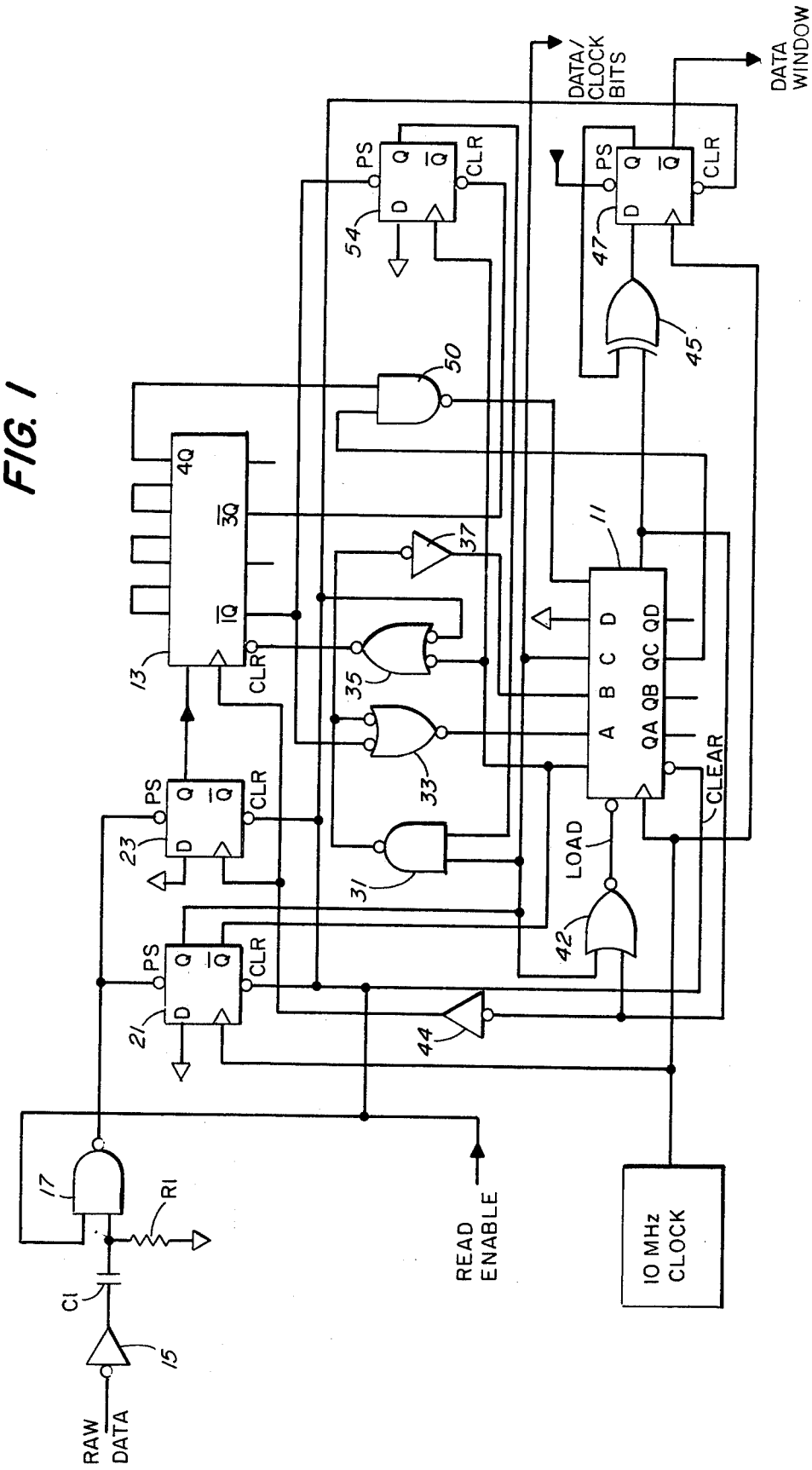
FIG. 1 is a schematic circuit diagram of data readback apparatus employing an adaptive digital time base constructed in accordance with the present invention.

The embodiment illustrated in FIG. 1 is particularly adapted for use in conjunction with the single chip, integrated-circuit floppy disk controller Model PD765C which is manufactured and sold by The Nippon Electric Co.(NEC). It should be understood that the invention may, however, be easily adapted for use with other controllers whether of the integrated circuit or discrete component variety.

Timing of individual data window intervals is provided using a loadable or presettable decade counter 11 while keeping track of successive window segments is accomplished by means of a shift register 13. As described in greater detail hereinafter, the counter is driven by a 10 MHz clock signal, obtained from a suitable source 14, while the state of the shift register is, in most cases, advanced under the control of the counter 13. Raw data from the floppy disk drive is applied to a Schmitt trigger circuit 15 having substantial hysteresis to obtain a squared up signal. This squared up signal is differentiated, by a network comprising capacitor C1 and resistor R1, to obtain a short spike on each transition. The positive-going spikes are in turn squared up by a NAND gate 17. The values of the components of capacitor C1 and resistor R1 are selected to produce a pulse of about 120 nanoseconds in width out of the NAND gate 17. These pulses then are the raw data/clock bits being read out by the floppy disk device itself and their timing will reflect any "bit shifting" which occurred on the surface of the disk.

Each data bit read out is stored in a pair of flip-flops 21 and 23. These flip-flops provide temporary storage of the data and also allow effective synchronization with the internal clock of the system, a ten megahertz signal as described previously. The Q output from the first flip-flop 21 provides the read data to the controller. The second flip-flop 23 acts as an input device or first stage to the shift register 13. As is explained in greater detail hereinafter, the shift register 13 is actuated to accept each data bit read in and to successively step it along the several stages of the shift register. In general, each step corresponds to the completion of a data window interval so that the state of the shift register reflects the number of data window intervals which have passed since the last bit was read from the floppy disk device.

As indicated previously, timing of individual data window intervals is done by the counter 11. In the particular embodiment illustrated, the data window interval is terminated in response to the generation of a CARRY (CA) signal by the integrated circuit counter 11, i.e. when the counter completes a counting sequence. The duration of each data window interval is selected or determined by loading or presetting a respective value into the counter at the start of each data window interval. As explained in greater detail hereinafter, loading of counter 11 is initiated upon either the acceptance of a new data bit from the floppy disk device or the completion of a data window interval as counted out by the decade counter 11.

NAND gate 31, NOR gates 33, and inverter 37 act as an encoding matrix which generates values for loading into the counter 11. The input signals for the encoding matrix are taken in part from the shift register 13 and the flip-flop 21 and in part from a shift compensation flip-flop 54. Flip-flop 54 operates, as described in greater detail hereinafter, to selectively adjust an initial delay provided before the first full data window following the receipt of a data pulse.

As indicated previously, the counter 11 is driven by a high frequency clock signal, e.g. at 10 megahertz. After the counter is loaded, it is advanced at the clock rate. When the counter reaches the state of nine, a carry signal is generated which lasts for one clock cycle, that is, until the counter is advanced to all zeros.

Figure 2:
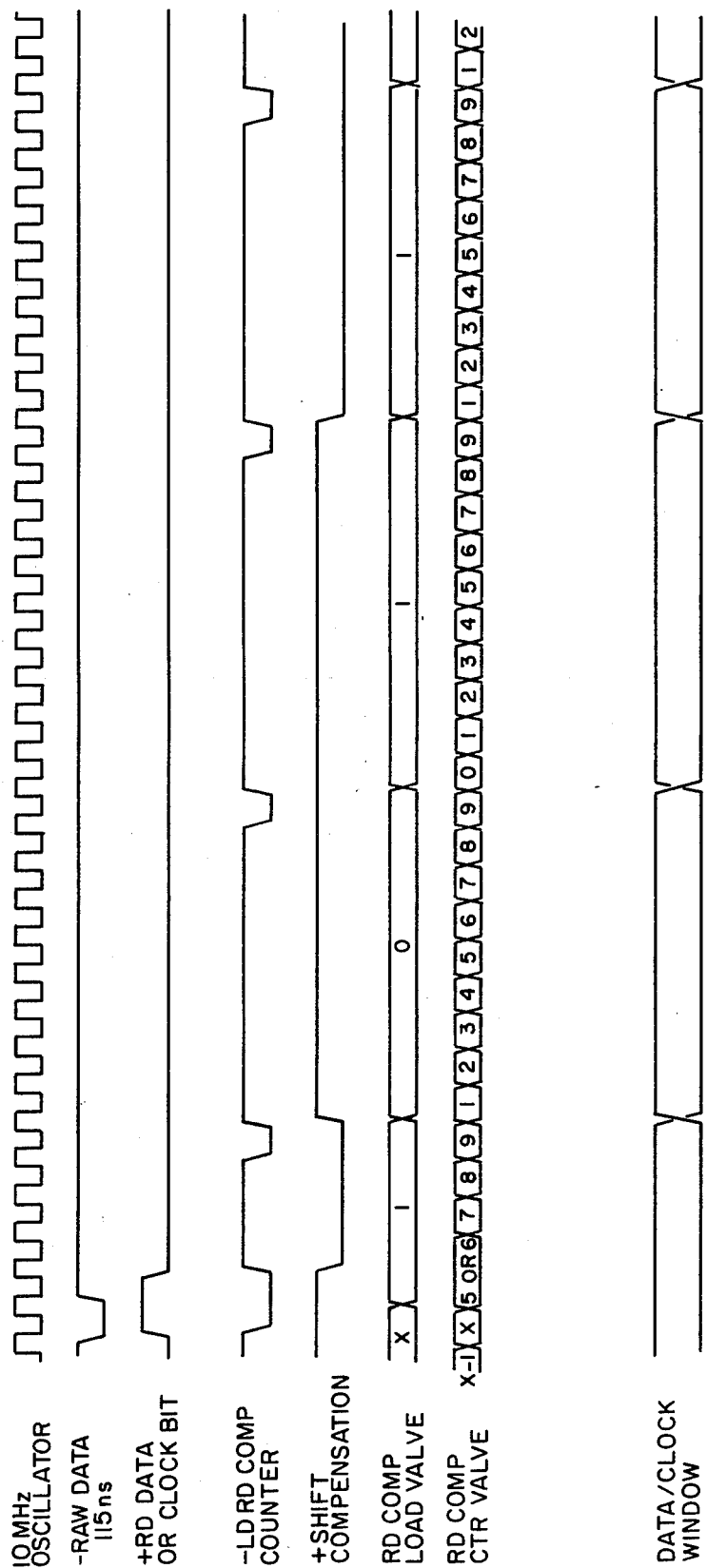
FIG. 2 is a timing diagram illustrating the operation of the circuit of FIG. 1.

Loading of the counter 11 is initiated by either a carry signal or by the receipt of a data/clock bit. For this purpose, the carry signal and the Q output signal from the input flip-flop 21 are combined in a NOR gate 24 whose output is applied to the load input terminal of counter 11. In the embodiment illustrated, counter 11 is of the synchronous type and is not released to count until the load signal terminates, even if another clock pulse occurs in the meantime. Since a bit received from the recording media, after being latched into flip-flop 21, can last longer than a clock cycle, the values chosen for loading under these circumstances are correspondingly adjusted. Thus, when a selected value is loaded into the counter on one clock cycle following receipt of a bit from the media, the counter is then incremented to the next higher value until the next clock pulse. This is illustrated in FIG. 2.

In addition to this possible 100 nanosecond delay upon loading, it should be understood that other delays may also occur in relation to the timing of a data/clock pulse derived from the floppy disk read electronics, due to an initial lack of synchronization between these pulses and the internal clock of the present system. In general, it should be understood that such additional delays may amount to another 100 nanoseconds, i.e. the digital rounding error. In the following description of the operation of the circuit, delays provided by the counter, both on initial delay and subsequent window intervals are described in terms of integral multiples of the clock period. It should be understood, however, that these other imprecise delays were also considered in picking the design parameters described and that the initial delays, when reference to a received data/clock pulse, will typically be somewhat longer than the time actually counted down by the counter 11 due to the initial skewing as the pulse is latched into the digital eelctronics of the system.

The carry signal from the counter 11 is also applied, through an exclusive OR (XOR) gate 45, to a D-type flip-flop 47 which is clocked by the high frequency clock signal. The other input to the XOR gate 45 is provided from the non-inverted (Q) output of the flip-flop 47. The inverted output from the flip-flop 47, i.e. the $\overline{Q}$ signal, is the read data window signal which is provided to the floppy disk controller. In the NEC PD765C controller, this input is pin 22.

The use of the XOR gate, in the manner illustrated, causes the state of the flipflop 47 to be complemented at the end of the clock cycle corresponding to the carry out signal if the carry out signal is still present at that time. If, however, the carry out signal is removed prior to that time, i.e. due to the counter 11 being reset or reloaded, no change will occur in the flip-flop 47. This allows a data bit being read out of the floppy disk device to be detected right up until the very end of a data window interval as determined by the counter 11, even though the carry signal has already been initiated. Further, if a data bit is so detected, no change will occur in the state of the data window signal being provided to the controller. The receipt of a data bit is signalled to the controller circuitry from the Q output of flip-flop 21. In the NEC PD765C controller, this input is pin 23.

In general, the completing of a counting sequence without a data bit being received from the floppy disk device will cause the flip-flop 47 to complement the state of the data window signal, signifying the end of the respective data window interval. After an adjustable initial delay, four data windows are provided for by the present apparatus. The first three data window intervals are of predetermined, through unequal, duration, the length of each being set by the respective value entered into the counter 11 by the encoding matrix at the start of the interval. The presently preferred window intervals and the preset values used to obtain them are set out in the diagram of FIG. 2. During the fourth interval, however, the counter is stopped so that the duration of that interval is indefinite, i.e. the apparatus simply waits until the next data bit is read out by the floppy disk device.

Stopping of the counter is provided by a NAND gate 50 which drives the enable terminal of counter 11. An inverted output from the fourth stage of the shift register 13 and the C output from the counter 11 are combined in the NAND gate 50 so that the counter is stopped when, during the fourth data window interval, the counter 11 reaches a count of "four".

As will be understood from the operation of the circuitry, as well as from the previous description to the effect that the present apparatus does not discriminate between data and clock pulse, the data window signal may be at either a "zero" or "one" during any given data window, depending upon the state of the flip-flop 47 when the last pulse (data or clock) was received. The proper operation of the overall system, including the controller, depends only on the complementing of the data window signal at the end of each window interval. Thus in interpreting FIG. 2 it should be understood that the data window signal could just as easily be the complement of the waveform shown.

The flip-flop 54 which selectively adjusts the value of initial delay following a received data bit is controlled by the shift register 13. The complemented output from the first stage of the shift register (1Q) is applied to the preset (PS) input of flip-flop 54 while the complemented output from the third stage of the shift register (3Q) is applied to the clear (CLR) input of the flip-flop. Accordingly, it can be seen that the flip-flop 54 becomes set at the start of the first complete data window interval and is cleared at the start of the third data window interval. In operation then, the flip-flop 54 will be set only during the first and second data window intervals. However, according to MFM encoding rules window #1 will never have a data/clock bit, therefore flip-flop 54 will have an operational effect only for window #2. As explained hereinafter, the flip-flop 54, when set, changes the load value being presented to the inputs of the presettable counter 11 upon the receipt of a data/clock pulse in such a manner that a shorter initial delay is obtained from the counter. In the embodiment illustrated, the initial delay is reduced by 100 nanoseconds, the initial delay being changed from 620 to 520 nanoseconds plus clock skew.

In order to minimize noise on the circuit board, much of the circuitry is disabled when the apparatus is not actually reading data from the diskette. The NEC PD765C controller provides, at its pin 24, a control signal which may be employed as a READ ENABLE for this purpose, though it is conventionally labeled as a VCO (voltage controlled oscillator) control signal. In the circuitry illustrated, this signal is used to gate the input signal (in NAND gate 17); to clear the input flip-flops 21 and 23; to clear the output flip-flop 47; and, in combination with the Q output of flip-flop 21 ORed in AND gate 35, to clear the shift register 13.

OPERATION

In general, the apparatus responds to a received data bit by generating an initial delay followed by four data window intervals timed in a manner appropriate for accommodating recorded data which may be subject to bit shifting. In particular, the operation of this circuitry is as follows, assuming initially that no data or clock bit has been received for some time. As will be understood from the encoding algorithm, this is not a valid situation during the actual reading of data but can occur on certain circumstances such as during initialization and write splices. It is also a useful starting point in the explanation. Under this assumption, the counter 11 will have been stopped at a count of four with the shift register 13 in its fourth state. Also the flip-flop 54 will have been cleared as the shift register proceeded through its third state.

When a data bit is then clocked into the flip-flops 21 and 23, the counter will be preset and the shift register will be cleared. The value initially entered into the counter 11 under these assumptions will be a "five" so that initial delay after loading the counter will be 600 nanoseconds, 100 nanoseconds due to the passage of a full clock before the counter is released and 500 nanoseconds as the counter is incremented to an all zeros state. With reference to the time of receipt of the data/clock pulse there will also be some further delay or skewing as described previously. This loading is implemented by the Q output of flipflop 21 which is applied to the load input of the counter through NOR gate 42. In other words, after six clock periods (load period and five count periods), the flip-flop 47 will be complemented signalling the start of the next data window interval.

In addition to causing the complementing of the flip-flop 47, the carry signal out of the counter 11, operating through NOR gate 42 also causes the counter to be again loaded as well as, through inverter 44, causing the shift register 13 to be incremented and the flip-flop 23 to be cleared. At this point, a value of "one" is entered into the counter. A data window of 0.9 microseconds will thus result as illustrated in FIG. 2. After the counter has counted out this interval and again complemented the flip-flop 47, the counter 11 will again be re-loaded. However, owing to the change in the state of the shift register, the value applied by the encoding matrix to the preset inputs to the counter 11 is changed to "zero". Thus, a one microsecond data window will result. Similarly, at the end of this time interval, the flip-flop 47 will again be complemented and the counter will be re-loaded. Owing to the further change in the state of the shift register, the value presented by the encoding matrix to the counter will now be again a "one" so as to yield a 0.9 microsecond data window.

At the end of this third data window interval, the output signal from the fourth stage of the shift register will go high. This raised signal, combined in NAND gate 50 with the third most significant bit from the counter 11, will cause the counter to be disabled on a count of "four". In effect, this makes the fourth data window of indefinite length since no timing or counting is going on at this point. If a data bit is then received in this situation, the counter will be loaded and the sequence just described will start over.

As may be understood from the foregoing description, the present invention provides for successive data windows, following a "last" received data bit, which are of differing lengths or durations. The apparatus also, however, contemplates that the starting point of the timing sequence will alter or adapt itself depending on the particular window in which a preceeding data bit is received. If a received data bit arrives during the second data window interval, the flip-flop 54 will have previously been set, i.e. during the first data window interval thereby changing one of the input signals to the encoding matrix. The value which therefore results at the preset inputs of the counter 11 is a "six" rather than a "five" and thus the initial delay will be 500 nanoseconds rather than 600 nanoseconds, i.e. 100 nanoseconds shorter. Again, it should be understood that there may be some additional delay, due to clock skew, when referenced to the received data/clock pulse.

The flip-flop 54 is cleared at the start of the third data window interval so that, if a data bit is received during this interval, the counter will again be reloaded with the value of "five". This changing in initial delay in effect takes into account the shift in time which may have occurred in the last received bit owing to its proximity to its predecessor whereas, the non-uniform durations of the subsequent data windows allows for the effect the last bit may have on the position of the next bit to be received if it is in close proximity.

With these two forms of compensation incorporated in the apparatus, a very adaptive time base is provided for regenerating the data window signal required to properly interpret each data or clock pulse and, thus, reliability with which data is recovered is greatly enhanced, i.e. to such as extent that the innermost tracks of the standard floppy diskette may be utilized even without precompensation.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. In apparatus for reading binary data serially recorded on magnetic media at a high density tending to produce bit shifting, there being a nominal time interval between possible bit positions during readback, the improvement of an adaptive time base comprising:
    means providing a clock signal at a frequency which is a large multiple of the frequency corresponding to said nominal interval;
    a presettable counter which can be stepped by said clock signal;
    means for generating a data window signal, which means includes means for complementing the state of said data window signal at the end of a count sequence of said counter;
    a shift register; and
    means, operative in response to a bit received from the media, for loading said counter and for entering a bit corresponding to the received bit into said shift register, said means being also operative, at the end of each count sequence, for loading into said counter a value which is a function of the state of said shift register and for advancing the state of said shift register.

2. Apparatus as set forth in claim 1 wherein said means for generating a data window signal includes a flip-flop and an exclusive OR gate which provide data input to said flip-flop, one input to said gate being taken from the non-inverted output of said flip-flop, and wherein said counter provides a carry signal at the end of a counting sequence, which carry signal is provided as the other input to said gate.

3. Apparatus as set forth in claim 1 including also means for selectively altering the value loaded into said counter when a bit is received from the media in accordance with the state of said shift register.

4. In apparatus for reading binary data serially recorded on magnetic media at a high density tending to produce bit shifting, there being a nominal time interval between possible bit positions during readback, the improvement of an adaptive time base comprising:
    means providing a clock signal at a frequency which is a large multiple of the frequency corresponding to said nominal interval;
    a presettable counter which can be stepped by said clock signal;
    means controlled by said counter for providing successive data window intervals of differing duration, each data window interval being a respective multiple of the clock period;
    means for generating a data window signal, which means includes means for complementing the state of said data window signal at the end of each data window interval determined by said counter;
    means responsive to a received data bit for setting said counter to provide one value of initial delay before the start of the next data window interval if the data bit is received during a predetermined one of the data window intervals following a preceding received data bit and for resetting said counter to provide a different value of initial delay if the data bit is received during other of said windows.

5. In apparatus for reading binary data serially recorded on magnetic media at a high density tending to produce bit shifting, there being a nominal time interval between possible bit positions during readback, the improvement of an adaptive time base comprising:
    means providing a clock signal at a frequency which is a large multiple of the frequency corresponding to said nominal interval;
    a presettable counter which can be stepped by said clock signal;
    means controlled by said counter for providing successive data window intervals;
    means for generating a data window signal, which means includes means for complementing the state of said data window signal at the end of each data window interval;
    means responsive to received data bits for presetting said counter; and
    latch means controlled by said counter and operative only during a selected one of said data window intervals for altering the value which is preset into said counter upon receipt of a data bit during that data window interval.

6. In apparatus for reading binary data serially recorded on magnetic media at a high density tending to produce bit shifting, there being a nominal time interval between possible bit positions during readback, the improvement of an adaptive time base comprising:

means providing a clock signal at a frequency which is a large multiple of the frequency corresponding to said nominal interval;

a presettable counter which can be stepped by said clock signal;

means controlled by said counter for providing successive data window intervals of differing duration, each data window interval being a respective multiple of the clock period;

means for generating a data window signal, which means includes means for complementing the state of said data window signal at the end of each data window interval determined by said counter;

means responsive to a received data bit for presetting said counter to provide a selected value of initial delay before the start of the next data window interval.

7. Apparatus as set forth in claim 6 in which the differing durations are obtained by presetting the counter with respective differing values, each data window interval being terminated when a predetermined count is reached.

8. Apparatus as set forth in claim 7 comprising a shift register for tracking the number of data window intervals occurring since the last bit received from the media and comprising also encoding means responsive to the shift register for determining the values loaded into the counter at the start of each data window interval.

9. In apparatus for reading binary data serially recorded on magnetic media at a high density tending to produce bit shifting, there being a nominal time interval between possible bit positions during readback, the improvement of an adaptive time base comprising:

means providing a clock signal at a frequency which is a large multiple of the frequency corresponding to said nominal interval;

a presettable counter which can be stepped by said clock signal;

means for generating a data window signal, which means includes means for complementing the state of said data window signal at the end of a count sequence of said counter;

a shift register;

means, operative at the end of each count sequence, for loading into said counter a value which is a function of the state of said shift register and for advancing the state of said shift register; and means, responsive to a received data bit, for entering, into said shift register, a data bit corresponding to the received bit, said means being also operative for loading into said counter a value providing one length of initial delay before the start of the next data window interval if the data bit is received during a predetermined one of the data window intervals following a preceding received data bit and for loading said counter with a value providing a different length of initial delay if the data bit is received during other of said windows.

10. Apparatus as set forth in claim 9 wherein said means for generating a data window signal includes a flip-flop and an exclusive OR gate which provide data input to said flip-flop, on input to said gate being taken from the non-inverted output of said flip-flop, and wherein said counter provides a carry signal at the end of a counting sequence, which carry signal is provided at the other input to said gate.

11. Apparatus as set forth in claim 9 including also means for selectively altering the value loaded into said counter when a bit is received from the media in accordance with the state of said shift register.

12. In apparatus for reading binary data serially recorded on magnetic media at a high density tending to produce bit shifting, there being a nominal time interval between possible bit positions during readback, the improvement of an adaptive time base generating a data window signal, said time base comprising:

means providing a clock signal at a frequency which is a large multiple of the frequency corresponding to said nominal interval;

a presettable counter which can be stepped by said clock signal and which generates a carry signal at a predetermined count value;

a flip-flop, the state of which determines the state of the data window signal;

an exclusive OR gate providing data to said flip-flop, one input to said gate being taken from the non-inverted output of said flip-flop, said carry signal providing the other input;

a shift register;

means, operative at the end of each count sequence, for loading into said counter a value which is a function of the state of said shift register and for advancing the state of said shift register; and means, responsive to a received data bit, for entering, into said shift register, a data bit corresponding to the received bit, whereby the state of the shift register is indicative of the number of data window intervals which have passed since a last bit was received from the media;

a second flip-flop;

means, responsive to said shift register, for setting said second flip-flop prior to the start of the second data window interval and for resetting said second flip-flop at the end of the second data window interval;

means, responsive to a bit received from the media, for loading into said counter a first value providing first length of initial delay if said second flip-flop is set and for loading into said counter a second value providing a longer length of initial delay if said second flip-flop is not set.

* * * * *